United States Patent [19]

Yamamoto et al.

[11] 3,829,831

[45] Aug. 13, 1974

[54] PATTERN RECOGNIZING SYSTEM

[75] Inventors: Shinji Yamamoto, Hachioji; Kazuo Nakata, Kokubunji, both of Japan

[73] Assignee: Hitachi, Ltd., Tokyo, Japan

[22] Filed: Nov. 10, 1972

[21] Appl. No.: 305,316

[30] Foreign Application Priority Data

Nov. 10, 1971 Japan ............................46-89021

[52] U.S. Cl. ............. 340/146.3 AQ, 340/146.3 MA

[51] Int. Cl. ............................................ G06k 9/12

[58] Field of Search ........... 340/146.3 R, 146.3 AQ, 340/146.3 Q, 146.3 H, 146.3 MA

[56] References Cited

UNITED STATES PATENTS

| | | | |
|---|---|---|---|
| 3,167,743 | 1/1965 | McDermid et al. | 340/146.3 R |
| 3,167,746 | 1/1965 | Reines et al. | 340/146.3 AQ |
| 3,182,290 | 5/1965 | Rabinow | 340/146.3 AQ |
| 3,271,739 | 9/1966 | Bonner | 340/146.3 AQ |
| 3,560,930 | 2/1971 | Howard | 340/146.3 H |

OTHER PUBLICATIONS

Harmon, "The Recognition of Faces," Scientific American, November, 1973, pp. 71–82, 136.

*Primary Examiner*—Paul J. Henon
*Assistant Examiner*—Leo H. Boudreau
*Attorney, Agent, or Firm*—Craig & Antonelli

[57] ABSTRACT

An unknown pattern is converted into first and second electrical signals respectively corresponding to 32 × 32 picture elements and 8 × 8 picture elements. The second electrical signal and signals of reference patterns for classification are compared, to select a probable category of reference patterns for discrimination. Reference patterns belonging to the probable category are taken out from among the discriminating reference patterns prepared beforehand. Signals of the patterns taken out and the first electrical signal are compared, to carry out the discrimination of the unknown pattern.

5 Claims, 22 Drawing Figures

PATENTED AUG 13 1974 3,829,831

| | | | | | | | |
|---|---|---|---|---|---|---|---|
| 0 | 4 | 5 | 5 | 5 | 5 | 5 | 1 |
| 2 | 10 | 12 | 15 | 15 | 13 | 11 | 4 |
| 0 | 2 | 4 | 12 | 12 | 4 | 2 | 0 |
| 1 | 8 | 11 | 15 | 16 | 11 | 8 | 1 |
| 0 | 3 | 5 | 12 | 12 | 6 | 4 | 0 |
| 0 | 0 | 2 | 10 | 10 | 1 | 0 | 0 |
| 7 | 12 | 12 | 15 | 14 | 10 | 10 | 6 |
| 2 | 5 | 5 | 5 | 5 | 5 | 5 | 3 |

| ANKNOWN PATTERN | EXAMPLE OF SELECTED FIRST REFERENCE PATTERNS |
|---|---|
| 王 | 王 玉 正 三 五 工 |
| 回 | 回 囲 固 団 国 図 面 画 圜 図 |
| 注 | 注 法 浅 決 往 |
| 械 | 械 機 検 補 板 |
| 向 | 向 宙 向 実 南 |
| 紙 | 紙 統 統 航 版 |
| 別 | 別 別 制 刷 期 |
| 論 | 論 講 談 議 線 |
| 通 | 通 道 遺 達 運 過 遠 速 速 適 |

FIG. 11
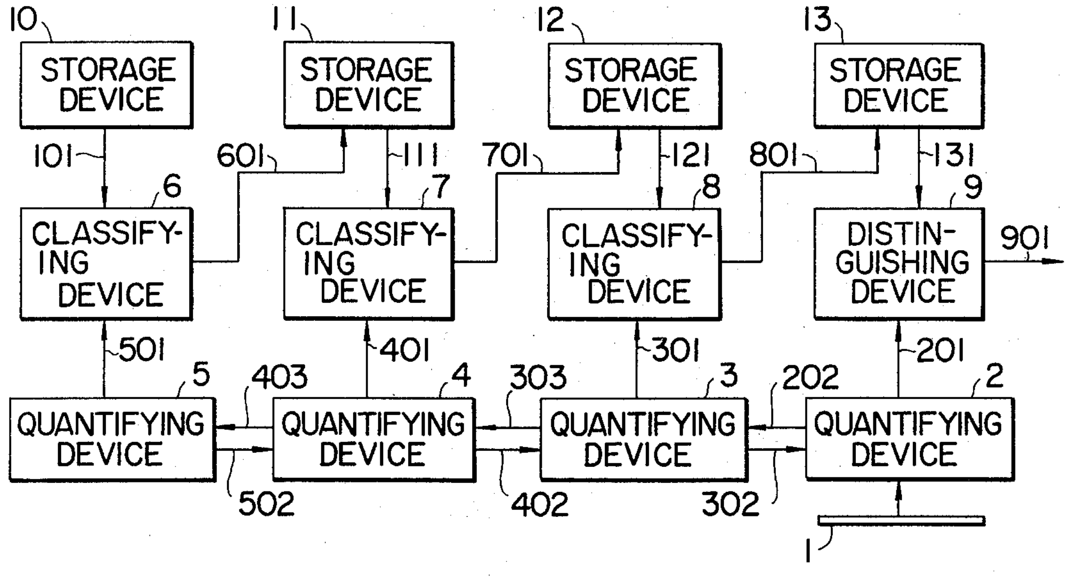
FIG. 12
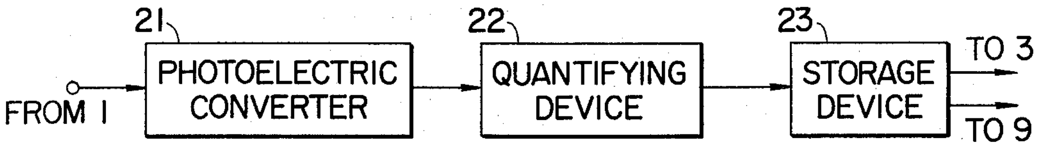
FIG. 13a
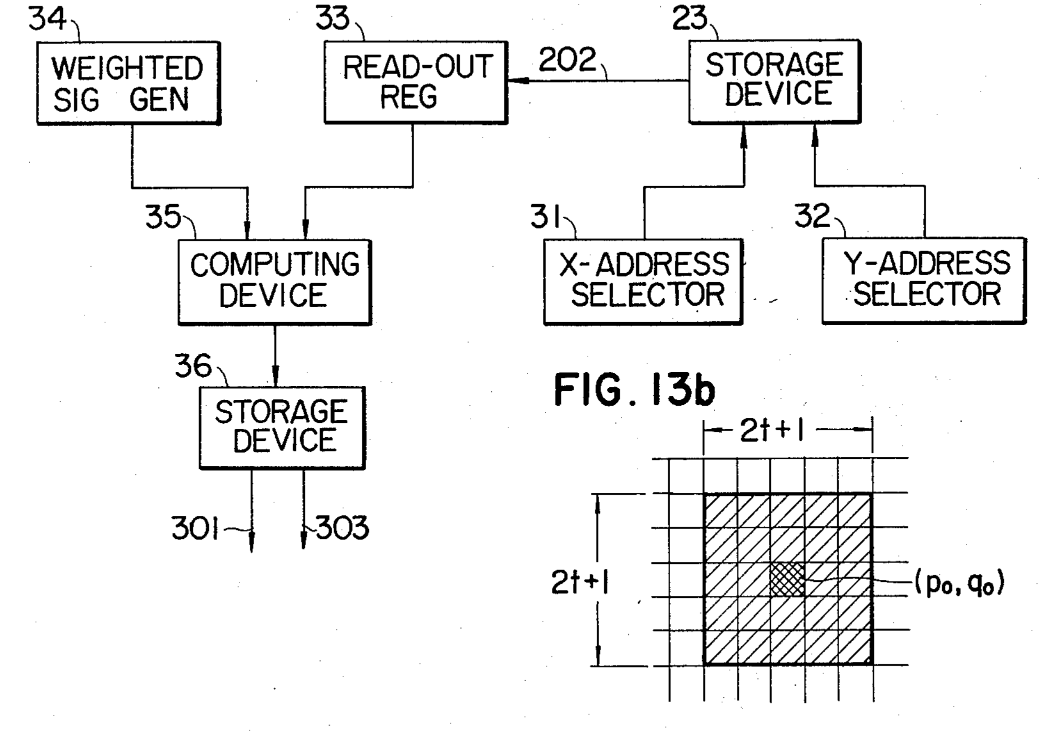
FIG. 13b

PATTERN RECOGNIZING SYSTEM

BACKGROUND OF THE INVENTION

1. Field of the Invention

The present invention relates to an efficient and highly accurate system for recognizing a group of patterns, such as Chinese character patterns, which have a number of categories.

2. Description of the Prior Art

There have already been proposed a large number of different character recognizing systems. Typical among them are systems based on the so-called pattern matching method in which character patterns are expressed by binary ("1" or "0") coded patterns and the recognition is carried out by taking the correlation of an unknown character with the binary coded patterns prepared beforehand, and means by which various characteristics in character patterns are extracted and the recognition is conducted by matching among the characteristic parameters. Especially, the former enables a highly precise recognition for printed characters, and is the most potent. Since, however, the number of patterns to be prepared need usually be equal to or larger than the number of categories, in the case involving an object, such as Chinese character patterns, having a large number of categories, the recognition process is subject to a limitation of the processing speed.

SUMMARY OF THE INVENTION

An object of the present invention is to remarkably raise the processing speed of pattern recognition which is based on the pattern matching method.

Another object of the present invention is to make the number of errors in pattern recognition very small.

The present invention is characterized by being constructed, in order to accomplish the above-mentioned objects, such that an unknown pattern is compared with each of a plurality of classifying reference patterns (first reference patterns) under the state of a small number of picture elements; specific patterns are selected in response to the result of the comparison and from among discriminating reference patterns (second reference patterns); and the selected patterns and the unknown pattern under the state of a larger number of picture elements are compared, thereby to perform the discrimination of the unknown pattern.

BRIEF DESCRIPTION OF THE DRAWINGS

FIG. 11 is a block diagram showing a different embodiment of the present invention; and FIGS. 12 to 15 are diagrams showing the detailed constructions of various parts of the embodiment in FIG. 11.

PREFFERED EMBODIMENTS OF THE INVENTION

Figure 1:
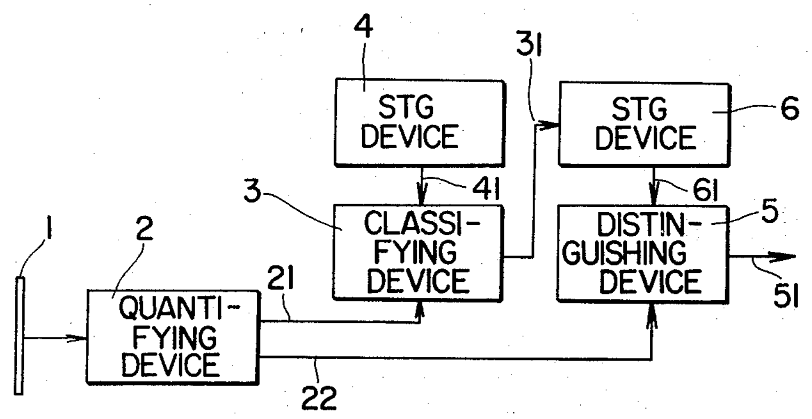
FIG. 1 is a block diagram showing the schematic construction of an embodiment of the present invention.

FIG. 1 is a diagram of the schematic construction of the present invention. Referring to the figure, numeral 1 designates an unknown pattern, 2 a quantizing device which converts the pattern into electric signals corresponding to $m_1 \times n_1$ picture elements and $m_2 \times n_2$ picture elements, 3 a classifying device which performs classification of the input pattern on the basis of the information of the $m_2 \times n_2$ picture elements, 4 a storage device for storing a plurality of first reference patterns for classification, 5 a distinguishing device which performs discrimination of the input pattern on the basis of the information of the $m_1 \times n_1$ picture elements, and 6 a storage device for storing a plurality of second reference patterns to distinguish.

The unknown pattern 1 is converted by the quantizing device 2 into the information 21 corresponding to the $m_2 \times n_2$ picture elements and the information 22 corresponding to the $m_1 \times n_1$ picture elements. The information 21 is inputted to the pattern classifying device 3, and is herein compared with the first reference patterns for classification from the classifying pattern-storing device 4. As a result of the classification, a signal 31 is outputted. The distinguishing pattern-storing device 6 receives the signal 31 from the pattern classifying device 3, and selects specific ones of the second reference patterns for discrimination in response to the signal 31. Only information 61 corresponding to the selected range of patterns are fed to the pattern distinguishing device 5. The pattern distinguishing device 5 compares therein the information 61 and the signal 22 from the quantizing device 2, and outputs distinguished results 51.

The details of the construction of each device will be described hereunder.

For the sake of convenience of explanation, it is assumed in the following that the $m_1 \times n_1$ picture element pattern has a number of picture elements forming an array of 32 × 32, one picture element being composed of the binary code of "1" or "0," while the $m_2 \times n_2$ picture element pattern has a number of picture elements forming an array of 8 × 8, one picture element being constituted of a code of 4 bits (16 levels). It is natural, however, that other coding notations may also be employed.

QUANTIZING DEVICE

Figure 2:
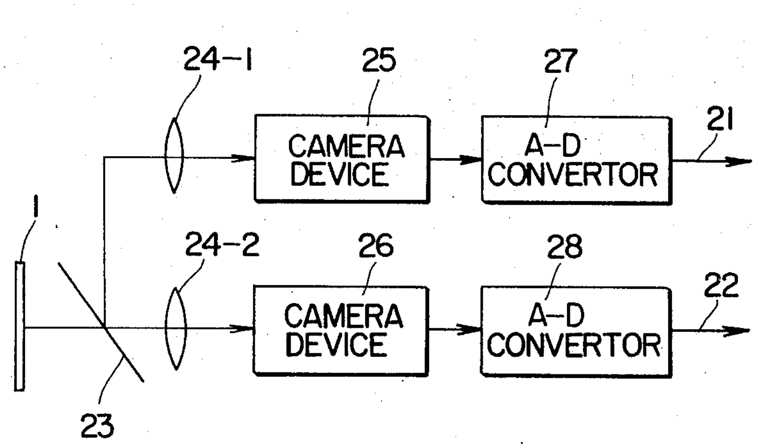
FIG. 2 is a block diagram of an embodiment of a pattern quantizing device.

FIG. 2 shows an embodiment of the quantizing device. Referring to the figure, the optical image of the unknown pattern 1 is split by a half-mirror 23. The split images are focused on the planes of camera devices 25 and 26 by optical systems 24 – 1 and 24 – 2, respectively. As the image pickup devices 25 and 26, conventional vidicons or the like can be used. The optical device 24 – 2 and the camera device 26 decompose the unknown pattern finely into 32 × 32 picture elements. Each analog video signal being the output of the device 26 is quantized into a binary signal by an analog-to-digital converter 28.

On the other hand, the optical device 24 – 1 and the camera device 25 conduct a coarser dissection than in the above, and decompose one character into 8 × 8 picture elements. Each output analog video signal of the device 25 is converted into a quantized signal of 16 levels by means of an analog-to-digital converter 27 of 4 bits. The analog-to-digital converters 27 and 28 can be readily realized by known techniques. In order to reduce the influence of a positional shift of the unknown pattern, it is effective to set the optical system 24 – 1 or 24 – 2 out of focus or to make the diameter of the spot of a light beam of the camera device 25 or 26 larger than the mesh pitch of the character.

While the foregoing embodiment relates to the case of use of a camera device, the quantizing device can also be easily realized by analogy with the above explanation in case of adopting a flying spot scanner.

FIGS. *3a* to *3c* illustrate another embodiment of the quantizing device. In FIG. *3a*, numerals 1, 24 – 2, 26 and 28 represent the same parts as in FIG. 2. Binary signals 22 of 32 × 32 picture elements are produced as the output of the device 28. The signals 22 are fed to a register 202, and information corresponding to one pattern is stored therein. Numeral 201 designates a weighted signal generator, 203 a counter, 204 a computing device, and 205 an analog-to-digital converter of four bits. The operation will be described hereunder, reference being had to FIGS. *3c* and *3c*.

The signals 22 correspond to the 32 × 32 picture elements as shown in FIG. *3b*. Output signals 21 are obtained by converting the signals 22 into 8 × 8 picture elements as shown in FIG. *3c*. More specifically, the signals 21 are produced in such a way that a group 206 consisting of 4 × 4 picture elements at the left end of the sections of the signals 22 in FIG. *3b* is converted into a single picture element 207 at the left end in FIG. *3c*, the next group 208 of the signals 22 as consists of 4 × 4 picture elements is converted into the next single picture element 209, and further conversions are similarly made. As the converting method, it may be adopted to evaluate a mere summation of 4 × 4 picture elements and to use the summation as the output 21 without any change. However, it is more effective to conduct a suitable weighting and thereafter evaluate the sum. The weighted signal generator 201 is a known device designed for this purpose, and generates 4 × 4 weighted signals using a resistance network (not shown). The computing device 204 consists of, for example, 4 × 4 multipliers (not shown) and an adder (not shown) for adding 16 results of the multiplications. Every picture element of the picture element group, e.g., 206 in the quantized pattern signals from the register 202, as illustrated in FIG. *3b*, is multiplied by the corresponding weighted signal from the weighted signal generator 201 by means of the corresponding multiplier. The summation of the multiplied results is outputted by the adder. The output result is converted into the digital signal 21 of 16 levels by means of the analog-to-digital converter 205 of four bits.

The register 202 is adapted to shift its contents bit-by-bit in synchronism with its input signal 22. As a synchronizing signal in this case, the output 210 of the camera device 26 is utilized. On the other hand, the counter 203 receives the y-synchronizing signal 210 and an x-synchronizing signal 211 from the device 26, carries out counting, and generates an output "1" every time 4 picture elements are counted in the y-direction within a scanning line of every 4 picture elements in the x-direction. The computing device 204 performs the foregoing operation so as to provide the output 21 only when the counter output 203 is "1." With such a construction, as the unknown pattern is scanned, the outputs corresponding to the converted picture elements 207, 209 . . . are sequentially produced. Thus, the unknown pattern consisting of the 8 × 8 picture elements can be formed from the unknown pattern consisting of the 32 × 32 picture elements.

In the above, description has been made, for the sake of convenience, of the case where the 4 × 4 picture elements are converted into the single picture element. In order to reduce the influence of a positional shift of the pattern, however, it is effective that the picture element group in FIG. *3b* as corresponds to the single picture element in FIG. *3c* is made so coarse as to be constituted of 6 × 6 picture elements, 8 × 8 picture elements and so forth, and that it overlaps the adjacent picture element group. This is readily realized by increasing the number of the weighted signal generators and the number of the multipliers.

PATTERN CLASSIFYING DEVICE

FIGS. *4a* to *4c* show a schematic block diagram of an embodiment of the pattern classifying device and diagrams for explaining its function. It is now assumed that, considering 8 × 8 = 64 dimensions of specific space, the input pattern is represented by one point in the space. Then, as shown in FIG. *4c*, the unknown patterns are distributed within the space (in the figure, the space is a two-dimensional specific one for the sake of convenience of explanation). It is therefore possible to define suitable spherical surfaces 311, 312 . . . , and to calculate the varying-density profile (8 × 8 picture elements) of a point corresponding to the center of each of the spherical surfaces. Accordingly, when it is desired to perform a classification involving, for example, 20 classes, 20 varying-density profiles for classification may be previously obtained, so as to determine to which one of the 20 classifying reference patterns the input pattern is the closest. Each reference pattern in this case is composed of the same number of picture elements (8 × 8) as that of the unknown pattern.

Letting $P_i$ ($i = 1, 2, \ldots 20$) represent twenty, by way of example, profiles for classification, and X represent an unknown input pattern, $$d_i^2 = (X - P_i)^2$$
$$= ||X||^2 + ||P_i||^2 - 2(X \cdot P_i) \quad (1)$$

is evaluated for each value *i*. With the class *i* which indicates the minimum value of $d_i^2$, the unknown pattern X is determined to belong to the i-th class. In order to realize the classification of Equation (1), three correlators 32, 33 and 34 and an adding and subtracting device 35 in FIG. *4a* are provided. The correlators 32, 33 and 34 are of the same construction, and a detail view of the correlator 34 is shown in FIG. *4b*. Referring to FIG. *4b*, a multiplier 34 – 1 has inputted thereto a signal 39 equivalent to the unknown pattern signal 21 consisting of the 8 × 8 picture elements and a classifying reference pattern output 41 from the storage device 4 for the pattern classification as shown in FIG. 2. Thus, the product between one picture element $X_{kl}$ of the 8 × 8 picture elements of the unknown pattern and the corresponding picture element $P_{kl}$ of the classifying reference pattern is calculated by the device 34 – 1. The result is inputted to an integrator 34 – 2. Such processing is successively performed for the 8 × 8 picture elements. The following calculated results are stored in the integrator.

$$(X \cdot P_i) = \sum_{k=1}^{8} \sum_{l=1}^{8} X_{kl} \cdot P_{\lambda l}$$

Since (X · X) and ($P_i \cdot P_i$) are respectively inputted to the correlators 32 and 33, the following is obtained as their signals.

$$\|X\|^2 = (X \cdot X) = \sum_{k=1}^{8} \sum_{l=1}^{8} X_{kl} \cdot X_{kl} \qquad (3)$$

$$\|P_i\|^2 = (P_i \cdot P_i) = \sum_{R=1}^{8} \sum_{l=1}^{8} P_{Rl} \cdot P_{Rl} \qquad (4)$$

The outputs given by the equations (2), (3) and (4) are applied to the adding and subtracting device 35, to obtain the result of the equation (1) as the output thereof. After the result is stored in a storage device 36, the second classifying reference pattern 41 is inputted.

On the other hand, a register 42 has bits corresponding to the 8 × 8 picture elements. The signal 21 and the output signal 39 of the register are applied thereto, and are added therein. Accordingly, the input signal 21 becomes the output 39 with a delay corresponding to the 8 × 8 picture elements, and the output is further fed-back to the input. Therefore, the head of the unknown pattern signal appears at the output 39 again in synchronism with appearance of the head of the second pattern at the signal 41. By repeating the processing as described above, accordingly, the deviations $d_i^2$ between the twenty patterns for classification and the unknown pattern are successively calculated, and the results are stored in the storage device 36. A minimum value detecting circuit 37 outputs a signal 31 representative of the number R of the classification pattern which indicates the minimum value among $d_i^2$ ($i = 1 - 20$) evaluated as in the above.

While the deviations $d_i^2$ between the classifying reference patterns and the unknown pattern have been evaluated in the form of Equation (1) in the above embodiment, $$d'^2_i = 1 - [(X \cdot P_i)/ \|X\|^2 \ \|P_i\|^2] \qquad (5)$$

can also be used instead as means often employed. This is easily realizable in such a way that, in place of the adding and subtracting device, a computing device including a multiplier and a divider is provided as the device 35 in FIG. 4($a$).

With the above operation, the class of the input unknown pattern can be restricted to the single class $i$. In the subsequent processing, only the probable patterns belonging to the class $i$ may be taken out from among the reference patterns for discrimination that are prepared in advance, and they may be compared with the unknown pattern for the discrimination.

Figure 5:
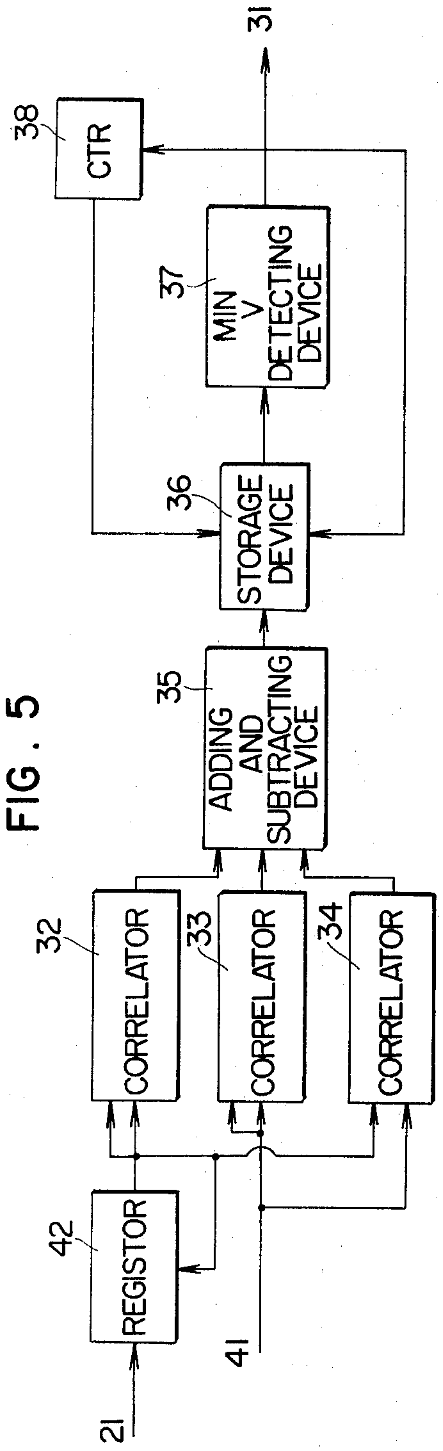
FIG. 5 is a block diagram of another embodiment of the pattern classifying device.

FIG. 5 shows another embodiment of the pattern classifying device. In the first embodiment stated above, the classifying reference patterns, the number of which is much smaller than the number of categories of the discriminating reference patterns, have been used. The present embodiment provides means by which classifying reference patterns, the number of which is equal to the number of categories, are prepared beforehand, the deviations between the respective reference patterns and the unknown pattern are evaluated using Equation (1) or (5), $n$ of the reference patterns are then selected out in the order of smallness of the deviations $d_i^2$ (or $d'^2_i$), and they are outputted as probable patterns for use in the discrimination. Accordingly, a distinguishing point between the first and second embodiments resides in that, in the first embodiment, probable patterns when a certain unknown input $i$ is specified are always fixed, whereas in the second embodiment, the combination of probable patterns always varies since the $n$ probable patterns at the closest positions from the unknown pattern are selected out.

Figures 4A, 4B:
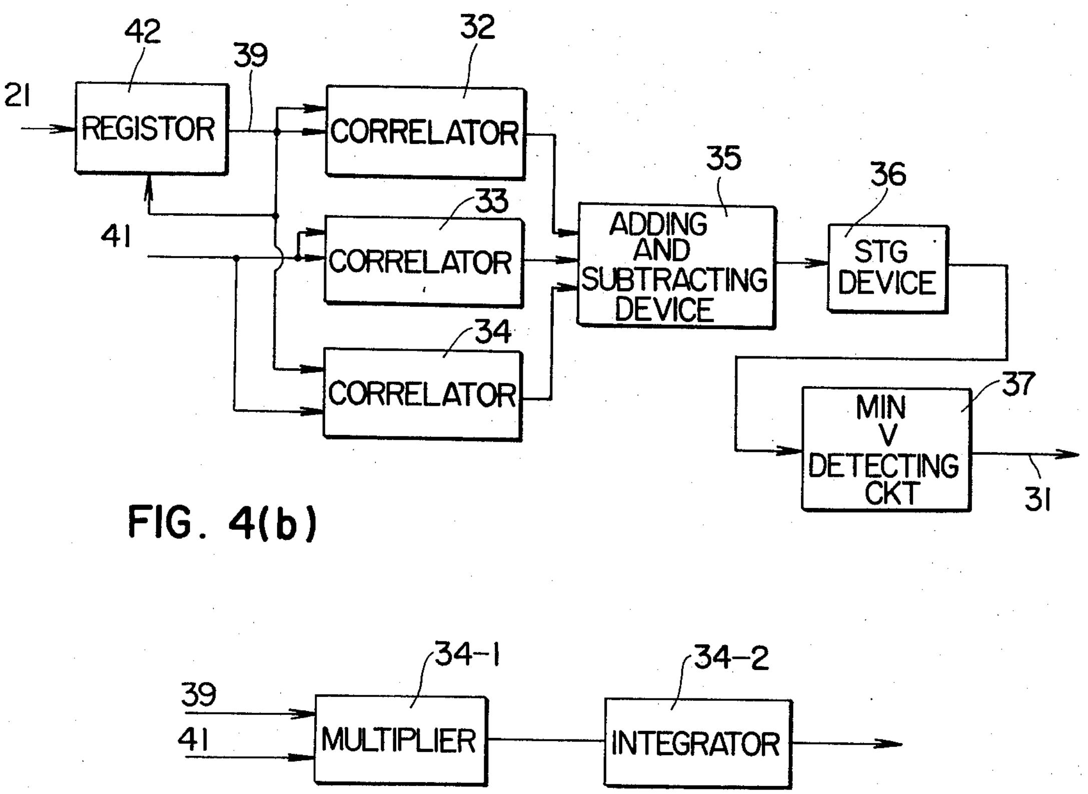
FIGS. 4*a* to 4*c* are diagrams showing an embodiment of a pattern classifying device, and for explaining it.
Figure 4C:
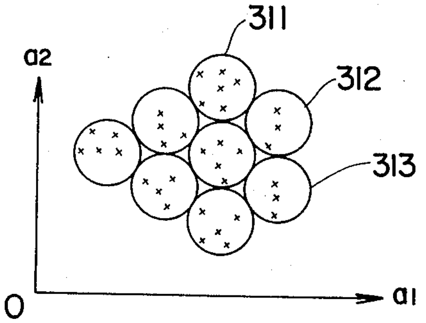

In FIG. 5, parts 42, 32, 33, 34, 35, 36 and 37 are the same devices as in FIG. 4$a$. In the embodiment, however, calculated values of $d_i^2$ (or $d'^2_i$, and both the forms of the deviation are generally represented by $d_i^2$ hereinafter) corresponding to the number of categories are stored in the storage device 36. In contrast to the embodiment in FIG. 4$a$, the output of the device 37 is fed-back to the device 36, and a counter 38 is provided.

The designation R of a category at which the value of $d_i^2$ becomes a minimum is obtained by calculation by means of the minimum value detecting circuit 37. The output R is fed to the storage device for distinguishing patterns. Simultaneously therewith, it is fed-back to the device 36, and the minimum value $d_R^2$ among the values $d_i^R$ stored therein is eliminated. At the same time, "+1" is added to the contents of the counter 38. Subsequently, a similar processing is conducted for the remaining $d_i^2$, whereby the second closest category $l$ is obtained. Thereafter, similar processings are repeated. When the counter 38 reaches a predetermined value $n$, a signal of operation completion is fed therefrom into the device 36, to end the processing.

The above second embodiment has the difficulty that the kinds of the classifying patterns to be prepared are more than those in the first embodiment. It is greatly advantageous in practical use, however, in that even in case where the classifying efficiency is conspicuously degraded due to the influence of noises in the unknown pattern with the first embodiment, a sufficiently efficient and stable operation is attained with the second embodiment.

A second advantage of the embodiment in FIG. 5 is enhancement in the processing speed in the distinguishing device described hereinbelow. Since the outputs of smaller $d_i^2$ are sequentially provided in accordance with the embodiment, the designations of categories to be correctly distinguished are outputted earlier on the average. On the other hand, owing to a strong correlation between the patterns for classification and the patterns for discrimination, which is one of the great features of the present invention, the fact that the deviation between the classifying pattern and the unknown pattern is small signifies that the deviation between the discriminating pattern and the unknown pattern is also small. It is accordingly possible that, by making the comparisons between the distinguishing patterns and the unknown pattern in conformity with the output sequence from the pattern classifying device in the distinguishing device as stated below, a recognized result is outputted by a much smaller number of comparisons than the number $n$ of probable categories on the average.

PATTERN DISTINGUISHING DEVICE

Figure 6:
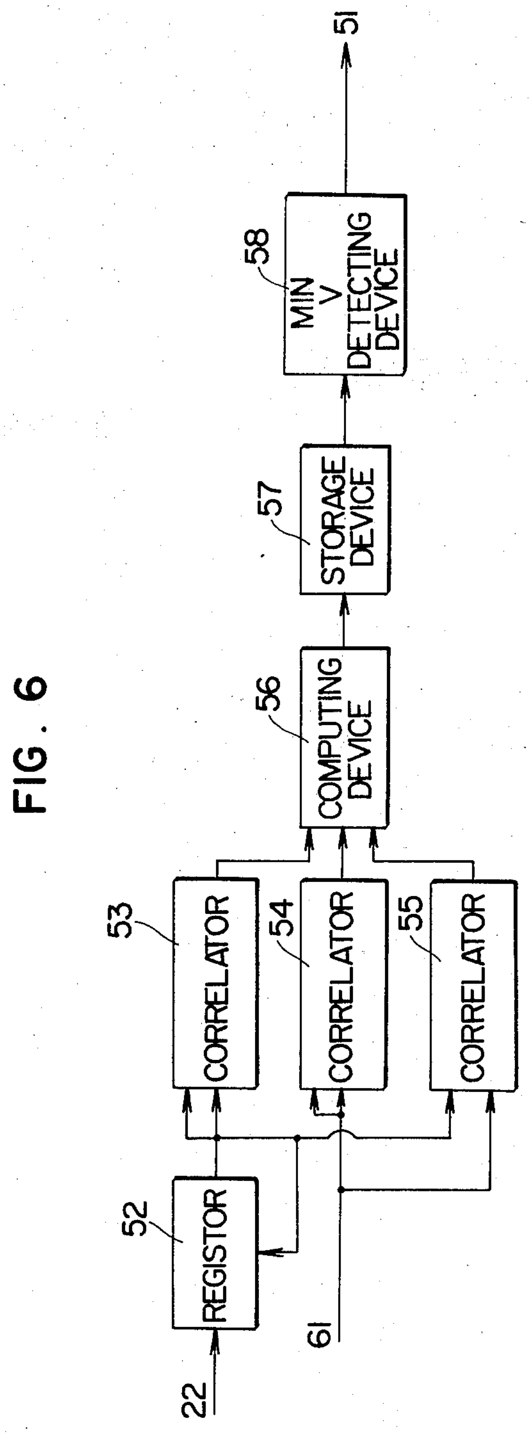
FIG. 6 is a block diagram of an embodiment of a pattern distinguishing device.

FIG. 6 is a detail view of the pattern distinguishing device. The construction of the device is almost the same as that of the pattern classifying device in FIG. 4$a$. The unknown pattern 22 consisting of 32 × 32 picture elements is fed to a register 52 corresponding to the 32 × 32 picture elements. The output of the register 52 is fed to correlators 53 and 55 and to the register itself. On the other hand, the output 31 from the pattern classifying unit in FIG. 1 is fed to the distinguishing pattern-storing device 6, so that only a group of distinguishing patterns belonging to one class indicated by the output of the device 6 or only $n$ probable distinguishing patterns (each consisting of 32 × 32 picture elements) are selected. The group of probable patterns are successively inputted to correlators 54 and 55 in FIG. 6 by means of a signal 61. Each of the correlators 53, 54 and 55 is constituted of 32 × 32 multipliers (not shown) and an adder (not shown) for evaluating the summation of the outputs thereof. As the outputs of the correlators 53, 54 and 55, there are respectively calculated:

$$(\tilde{X}\cdot\tilde{P}_i)=\sum_{R=1}^{32}\sum_{l=1}^{32}\tilde{X}_{Rl}\cdot\tilde{P}_{Rl} \quad (6)$$

$$(\tilde{X}\cdot\tilde{X})=\sum_{R=1}^{32}\sum_{l=1}^{32}\tilde{X}_{Rl}\cdot\tilde{X}_{Rl} \quad (7)$$

$$(\tilde{P}_i\cdot\tilde{P}_i)=\sum_{R=1}^{32}\sum_{l=1}^{32}\tilde{P}_{Rl}\cdot\tilde{P}_{Rl} \quad (8)$$

where $\tilde{X}_{Rl}$ represents the information of one picture element of the unknown pattern consisting of the 32 × 32 picture elements, and $\tilde{P}_{Rl}$ the information of one picture element of each distinguishing reference pattern consisting of the 32 × 32 picture elements.

A computing device 56 computes $$D_i^2=(\tilde{X}-\tilde{P}_i)^2 \quad (9)$$

$$D'^2_i=1-[(X\cdot P_i)/\|\tilde{X}\|^2\cdot\|\tilde{P}_i\|^2] \quad (10)$$

$D_i^2$ is computed for each probable pattern $\tilde{P}_i$, and the results of the computations are stored in a storage device 57. When the comparisons with all the probable patterns $\tilde{P}_i$ are completed, the minimum value of the contents within the device 57 is detected by a minimum value-detecting circuit 58. A category R having the minimum value $D_R^2$ or $D'^2_R$ is finally outputted as a recognized result 51.

Figure 7:
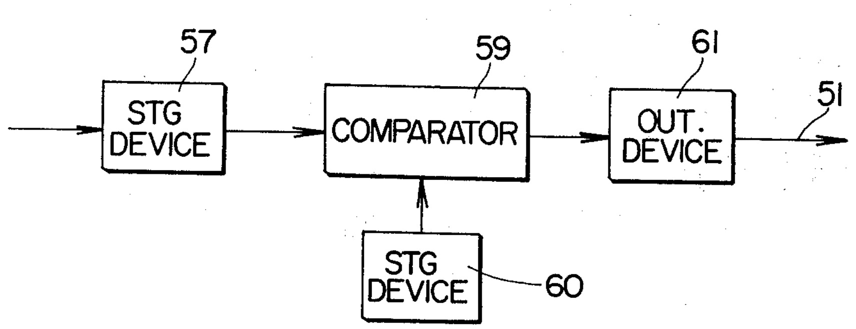
FIG. 7 is a block diagram of another embodiment of the pattern distinguishing device.

FIG. 7 shows another embodiment of the pattern distinguishing device. The embodiment is especially effective when the second embodiment in FIG. 5 is employed as the pattern classifying device.

Referring to FIG. 7, numeral 57 designates a storage device which is quite the same as that in FIG. 6. The respective devices, 52, 53, 54, 55, 56 and 57 in FIG. 6 are also used in the present embodiment as they are, but the devices at or before 56 are omitted from the illustration.

Shown at 60 in FIG. 7 is a storage device, in which the quantities of allowable errors $E_i^2$ pertaining to $D_i^2$ or $D'^2_i$ are previously stored for the respective categories. A comparator 59 in FIG. 7 successively compares the signals $D_i^2$ or $D'^2_i$ from the device 57 and the signals $E_i^2$ from the device 60, and outputs a signal of category $i$ only at $D_i^2$ ($D'^2_i$) > $E_i^2$. Reference numeral 61 designates an output device consisting of a counter and a gate circuit. When the input from the comparator 59 includes only the signal of one category (distinguished reference pattern) at the time at which the comparisons with $n$ probable categories are completed, the output device 61 outputs the signal as a recognized result. When the input includes two or more categories, the output device 61 outputs a signal designating impossibility of recognition.

Figure 8:
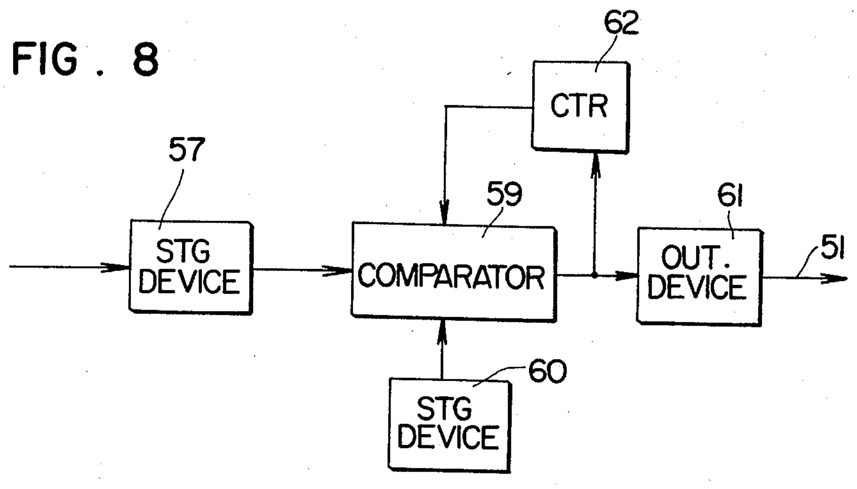
FIG. 8 is a block diagram of still another embodiment of the pattern distinguishing device.

FIG. 8 shows still another embodiment of the pattern distinguishing device, in which a counter 62 is added to the circuit arrangement in FIG. 7. The embodiment attains enhancement in the processing speed in the pattern distinguishing device, and is very effective when the second embodiment is employed as the pattern classifying device.

Unlike the second embodiment of the pattern distinguishing device as stated above, the third embodiment in FIG. 8 makes the comparisons on P probable patterns predetermined from the first output from the device 57 by the counter 62, without making the comparisons on all the $n$ probable patterns determined by the pattern classifying device. If the output signal from the comparator 59 includes one category within the range, the result is made the final recognition result. If it includes two or more categories, the output designating impossibility of recognition is provided. In the case where there is quite no output until this time, the processing as in the second embodiment is conducted for all the $n$ probable patterns.

The foregoing processing has been made feasible for the first time since, as already stated, the patterns for classification and the patterns for discrimination are closely related. It has been made possible by the embodiment to raise the processing speed of the distinguishing device without any degradation in the recognizing precision.

Figure 3A:
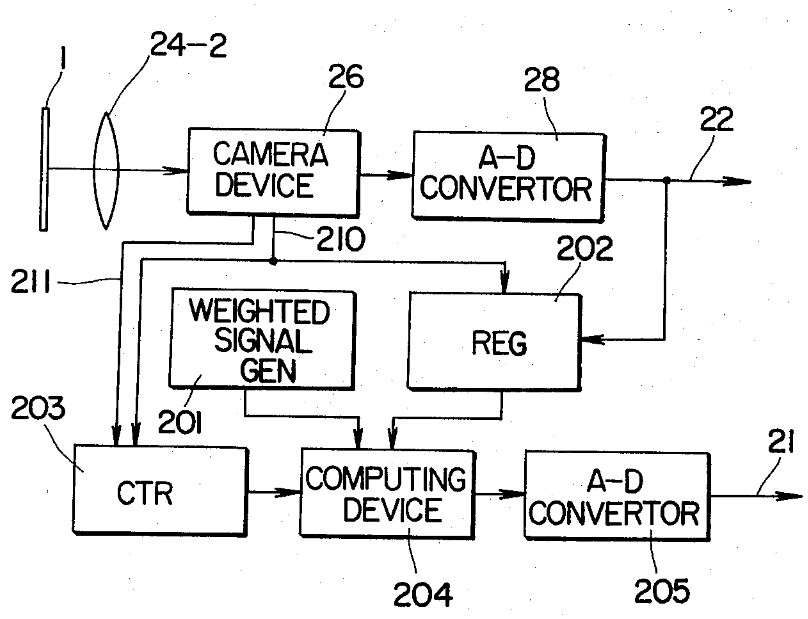
FIGS. 3*a* to 3*c* are diagrams showing another embodiment of the pattern quantizing device, and for explaining it.
Figure 3B:
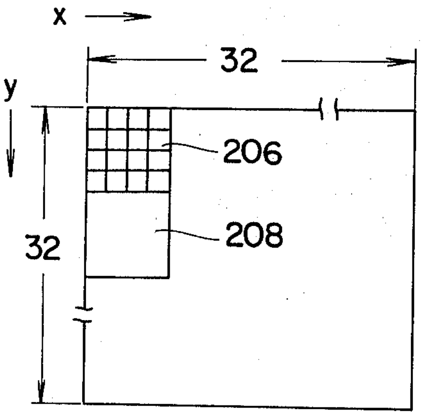
Figure 3C:
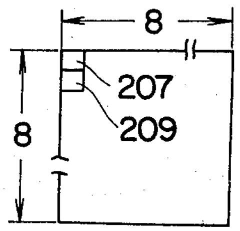

As described above, Chinese character recognizing apparatus or the like recognizing apparatus for a number of category patterns, as is truly practical from the point of view of the processing speed, has become realizable by virtue of the recognizing system of the present invention. This is illustrated in FIG. 9($a$) in connection with a specific example. FIG. 9($a$) shows a pattern for use in discrimination, which is composed of 32 × 32 picture elements, one picture element being constituted of one bit. FIG. 9($b$) shows a pattern for use in classification, which is composed of 8 × 8 picture elements, one picture element being constituted of four bits. The pattern in FIG. 9(*b*) represents the same Chinese character "王" ("king" in English) as in FIG. 9(*a*), and is obtained from the pattern in FIG. 9(*a*) by the means illustrated in FIGS. 3*a* to 3*c*.

Now, assume a case where the classifying patterns are not adopted and where the distinguishing patterns and the unknown pattern are directly compared. Letting $t_0$ be the period of time required for the calculation of the correlation per picture element, the period of time required for the correlation between one reference pattern and the unknown pattern is $(32 \times 32) \times t_0 = 1{,}024\ t_0$. Assuming that the number of Chinese characters is 2,000, the period of time of $$2{,}000^{(\text{characters})} \times 1{,}024 t_0 \cong 10^6 t_0$$

is required for recognition of one character.

On the other hand, in the present invention employing the classifying patterns, the period of time required for the correlation between one classifying pattern and the unknown pattern is $(8 \times 8) \times t_0 = 64\ t_0$. Even in case of employing the classifying method illustrated in FIG. 5 (the second embodiment of the pattern classifying device), which necessitates a comparatively long processing time, the period of time required for selecting a probable group of distinguishing patterns becomes $$2{,}000^{(\text{characters})} \times 64 t_0 = 1.28 \times 10^5 t_0.$$

Since, according to experiments, the number of the probable patterns selected by the method is approximately 50 on the average, the period of time of the calculation of the correlation for discrimination is $50^{(\text{characters})} \times 1{,}024\ t_0 \cong 0.5 \times 10^5\ t_0$. Accordingly, the recognizing time per character in the present invention is $1.8 \times 10^5\ t_0$. As compared with the system which does not adopt the classifying patterns, the invention can perform the recognition of one character in a processing time of one-tenth. The effect is of the greatest value.

Figures 9A, 9B, 10:
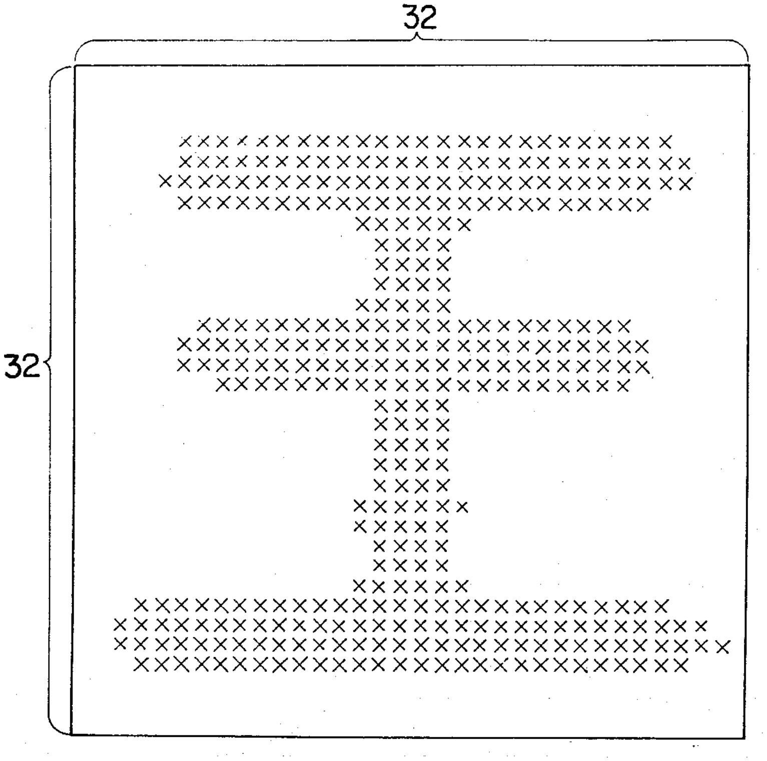
FIGS. 9*a* and 9*b* illustrate examples of input patterns.
FIG. 10 illustrates examples of probable patterns.

The pattern in FIG. 9(*b*) has the condensation of information so made that it is difficult to visually recognize as "王." However, since the pattern "王" in FIG. 9(*a*) is reduced, the essential information of the original pattern are held in a more reasonable form than in any other characteristic extracting system. It has been experimentally revealed that the pattern in FIG. 9(*b*) is hardly subject to the influence of additional noises. As illustrated in FIG. 10, probable patterns (examples are listed in the order of smallness of the quantity of error) selected by the classifying method illustrated in FIG. 5 are considerably similar to the visual method owing to the above-mentioned property, and corresponds well to a rough process in the process of pattern recognition which a man performs. This gives a prospective method for enhancing reliability in accuracy, and is very greatly effective in design.

In the foregoing, the probable pattern classification for the selection of distinguishing reference patterns is conducted at only one step. If the classification is performed at two or more steps, the accuracy of the classification is made higher.

FIG. 11 shows an embodiment in which the classification of probable categories is carried out in three steps, while the discrimination is carried out in one step. In the figure, numeral 1 designates an unknown pattern X, and numerals 2 – 5 represent devices for composing patterns X(1) – X(4). As means to compose the patterns X(1) – X(4) from the unknown pattern X, four sets of devices for photoelectric conversion and quantization of a picture may be prepared so as to make X(1) – X(4) respectively independent. However, this leads to a high cost of equipment. In the embodiment in FIG. 11, therefore, only the pattern X(4) for the fourth layer is formed by means of the photoelectric converter and the quantizing device.

The device 2 comprises a photoelectric converter, a quantizing device, and a storage device for storing the result of quantization, and has details shown in FIG. 12. In FIG. 12, the photoelectric converter subjects the unknown pattern 1 to photoelectric conversion at 32 × 32 (picture elements) × 4 bits, the quantizing device 22 quantizes the result of the photoelectric conversion, and the storage device 23 stores the quantized pattern. The photoelectric converter may be a conventional photoelectric conversion device, such as a vidicon or a flying spot scanner. The quantizing device and the storage device can also be easily realized with conventional devices often employed.

The device 3 in FIG. 11 is a sampling circuit for composing the pattern X(3) of 16 × 16 (picture elements) × 4 bits.

The sampling device composes the 16 × 16 picture-element pattern by sampling every second picture element of the 32 × 32 picture-element pattern stored in the device 23 in FIG. 12. Although, at this time, it may be adopted to merely sample the picture elements every second one, it is more effective to conduct the sampling after a suitable processing of obscuring the picture. FIG. 13*a* shows a detail view of the device 3 in FIG. 11.

Referring to FIG. 13*a*, numerals 31 and 32 designate X- and Y-address selectors, respectively, by which an arbitrary address of the storage device 23 storing pattern X(4) of 32 × 32 picture elements can be specified. Shown at 33 is a read-out register which, in accordance with the address specification $(p_o, q_o)$ by the selectors 31 and 32, reads out $(2t + 1)$ picture element information at the point $(p_o, q_o)$ and the upper, lower, right and left parts around the point within the pattern X(4) from the storage device 23. The relation in arrangement between the point $(p_o, q_o)$ and the information stored in the read-out register 33 is as illustrated in FIG. 13*b*. In the figure, the case of $t = 2$ is shown. Numeral 34 indicates a weighted signal generator for effecting a suitable obscuring processing. It imparts weights to the respective lattice points of a square having $(2t + 1)$ points as one side in correspondence with the register 33.

Now, letting $x_{ij}$ be each picture element information of the contents of the register 33 and $w_{ij}$ be the weight of the device 34 which corresponds thereto, a computing device 35 carries out the following operation:

$$S = \frac{1}{N} \cdot \sum_{i=-t}^{t} \sum_{j=-t}^{t} x_{ij} w_{ij} \qquad (11)$$

N in Equation (11) represents a normalizing coefficient (device) in order to make the output S expressible with 16 levels of level 0 – level 15 or within four bits. It is a previously set constant device. Shown at 36 is a storage device for storing the output S.

With the above apparatus, the address specifying quantities 31 and 32 first designate the left end and upper end positions of the 32 × 32 picture elements as the point $(p_o, q_o)$. The operated result of Equation (11) at this point is stored in the storage device 36. Next, a similar operation is performed with "2" added to $p_o$, and the result is stored.

Thereafter, Equation (11) is calculated for all the combinations between $(p_o, p_o+2, \ldots p_o+30)$ and $(q_o, q_o+2, \ldots q_o+30)$, to thereby compose the pattern X(3) of 16 × 16 (picture elements) × 4 bits. The results are stored in the device 36.

The devices 4 and 5 in FIG. 11 are quite the same in construction as the device 3, and successively compose the patterns X(2) and X(1). As regards the values of the weights $w_{ij}$, appropriate ones can be chosen in the respective cases of the devices 3 – 5 in FIG. 11.

In FIG. 11, numerals 10 – 13 all indicate storage devices, which store a group of reference patterns for the first pattern X(1), a group of reference patterns for the second pattern X(2), a group of reference patterns for the third pattern X(3) and a group of reference patterns for the fourth pattern X(4) (a group of reference patterns for discrimination), respectively.

Figure 14A:
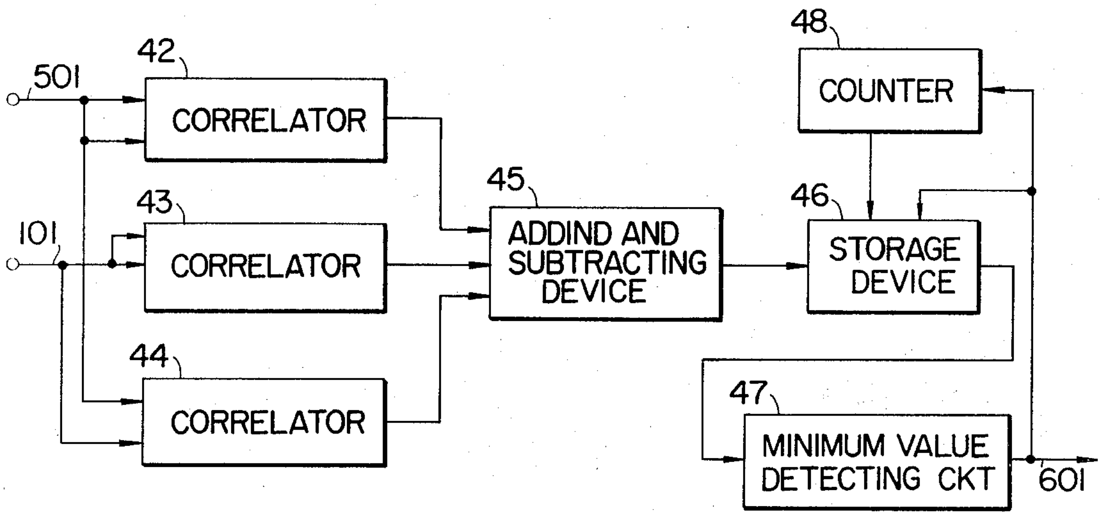
Figure 14B:
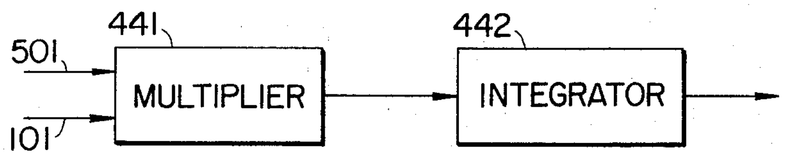
Figure 14C:
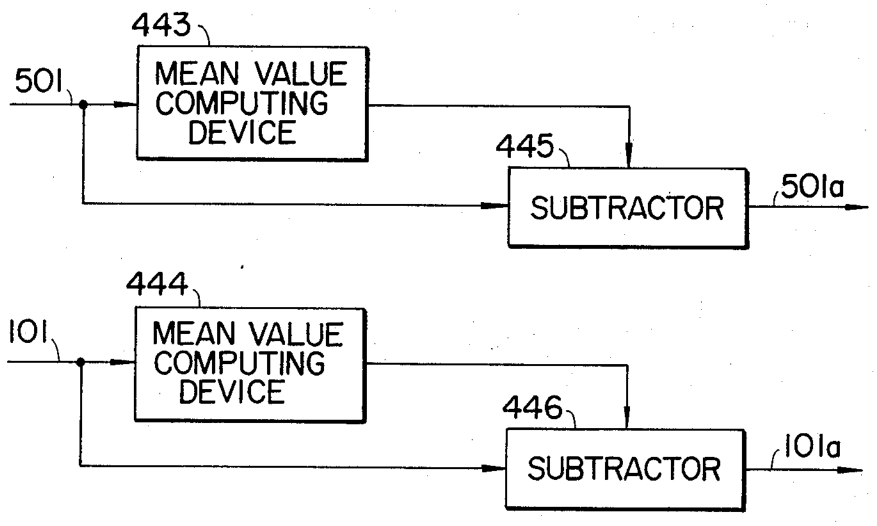

Numerals 6 – 8 in FIG. 11 designate pattern classifying devices for the first - third patterns X(1) – X(3), respectively. Numeral 9 designates a pattern distinguishing device for the fourth pattern X(4). A detail view of the pattern classifying device 6 is shown in FIGS. 14*a* to 14*c*.

The principle of classification is as below. Letting $x_{ij}$ be each picture element of the input pattern X, and $P_{ij}^{(r)}$ be each picture element of a reference pattern $P_r$ at the $r$-th category, $$d^{(r)} = (X - P_r)^2 = ||X||^2 + ||P_r||^2 - 2\,(X, P_r) \quad (12)$$

where $$||X||^2 = \sum_i \sum_j (X_{ij})^2 \quad (13)$$

$$||P_r||^2 = \sum_i \sum_j (P_{ij}^{(r)})^2 \quad (14)$$

$$(X, P_r) = \sum_i \sum_j (X_{ij}) \cdot (P_{ij}^{(r)}) \quad (15)$$

Equation (12) is evaluated for each category $r$. $K_1$ ($K_2 - K_4$ for the second – fourth patterns X(2) – X(4), respectively; probable categories are selected out in order from one of the minimum $d^{(r)}$.

The pattern classifying device illustrated in FIGS. 14*a* – 14*c* is a device which calculates, on the basis of the above principle, Equation (12) between the input pattern X(1) (4 × 4 picture-element pattern) at the output of the device 5 in FIG. 11 and the $r$-th standard pattern $P_r(1)$ at the output of the device 10 in FIG. 11, and which outputs the designations of $K_1$ probable categories. Devices 42, 43 and 44 in FIG. 14*a* are correlators of the same type, and the details of the correlator 44 are shown in FIG. 14*b*. In FIG. 14*b*, unknown-pattern signals 501 each consisting of 4 × 4 picture elements and signals 101 of the first reference pattern (inputted from the storage device 10) each consisting of 4 × 4 picture elements are successively inputted to a multiplier 441.

Thus, the product between $x_{ij}$ and $P_{ij}^{(r)}$ is computed by the multiplier 441, to input the result to an integrator 442. This processing is sequentially carried out for the 4 × 4 picture elements, to obtain $(X, P_r)$ of Equation (15) as the output of the integrator 442, namely, that of the correlator 44.

The outputs of the correlators 42, 43 and 44 are inputted to an adding and subtracting device 45, thereby obtaining $d^{(1)}$ of Equation (12) as the output of the device 45. After the result is stored in a storage device 46, the second reference pattern is inputted as a signal 101. The value $d^{(2)}$ of Equation (12) is obtained by conducting a quite similar processing. Thereafter, the distances or deviations $d^{(r)}$ between the unknown pattern and all the reference patterns in the storage device 10 are similarly evaluated, and are stored in the storage device 46.

Shown at 47 is a minimum value detecting circuit, which obtains the minimum value Min $\{d^{(r)}\}$ among all the values of $d^{(r)}$ and which outputs the designation $r$ of the corresponding category as 601. The output $r$ is transferred into the storage device 11 for second-classifying patterns X(2). Simultaneously therewith, it is fed-back to the storage device 46, to eliminate the value of Min $\{d^{(r)}\}$ among $d^{(r)}$ stored therein.

At the same time, "+1" is added to a counter 48. Next, a similar processing is performed for the remaining $d^{(r)}$. Thus, the second smallest value of $d^{(r)}$ is evaluated, and the designation of the corresponding category is outputted as a signal 601. Similar processings are thereafter repeated, and when the contents of the counter 48 reach the predetermined value K1, a signal of operation completion is fed from the counter 48 to the storage device 46 to complete the first classification processing.

Pattern classifying devices 7 – 9 in the second and third classification have the same construction as the first-layer pattern classifying device, and can be readily analogized. Differences, however, are included as below. In the first classification, Equation (12) is calculated for all the reference patterns stored in the storage device 10. In contrast, in and behind the second classification, probable category signals from the preceding stage (the output 601 of the first in the case of the second classification) are received, and only those addresses of the reference pattern-storing devices of the respective classification (the device 11 in the case of the second layer) which store specific patterns are specified by the signals. In and behind the second layer, accordingly, the calculations of the distances or deviations $d^{(r)}$ between the specific reference patterns and the unknown input pattern are carried out. In addition, the distinguishing device 9 for the fourth discrimination does not require a counter corresponding to the counter 48 in FIG. 14*a*, and may make the minimum value Min $\{d^{(r)}\}$ among $d^{(r)}$ a recognized output 901.

An example of the aspect of the present invention is as stated above. As another embodiment, the following classifying criterion, by way of example, may be employed in place of Equation (12):

$$d^{(r)'} = 1 - [(X, P_r) / \sqrt{||X||^2 \cdot ||P_r||^2}] \quad (16)$$

or $$d^{(r)''} = (\hat{X} - \hat{P}_r) \quad (17)$$

where $$\begin{cases} \hat{X} = X - \overline{X},\ \hat{P}_r = P_r - \overline{P}_r \\ \overline{X} = \frac{1}{M} \sum_i \sum_j x_{ij},\ \overline{P}_r = \frac{1}{M} \sum_i \sum_j P_{ij}^{(r)} \end{cases}$$

or $$d^{(r)'''} = 1 - [(\hat{X}, \hat{P}_r) / \sqrt{\|\hat{X}\|^2 \cdot \|\hat{P}_r\|^2}] \quad (18)$$

The case of Equation (16) can be readily realized in such a way that a computing device including a multiplier, a divider and a square root-calculating device is provided instead of adding and subtracting device 45 in FIG. 14. In the case of Equation (17), input signals 501 and 101 to the correlators 42, 43 and 44 in FIG. 14$a$ may be first subjected to arithmetic operation as illustrated in FIG. 14$c$, so as to input the resulting outputs 501$a$ and 101$a$ to the correlators 42, 43 and 44 in place of the signals 501 and 101, respectively.

In FIG. 14$c$, numerals 443 and 444 designate mean value computing devices, the former evaluates the mean value $\overline{X}$ of the input pattern X, and the latter evaluates the mean value $\overline{P_r}$ of the reference pattern $P_r$.

Subtractors 445 and 446 output after the evaluations of $\overline{X}$ and $\overline{P_r}$, the result 501$a$ with $\overline{X}$ of the output of the device 443 subtracted from each picture element $x_{ij}$ of the input pattern X and the result 101$a$ with $\overline{P_r}$ of the output of the device 444 subtracted from each picture element $P_{ij}^{(r)}$ of the standard pattern $P_r$. In this manner, the distance or deviation $d^{(r)''}$ of Equation (17) can be evaluated. The case of Equation (18) can also be easily realized by combining the form of Equation (16) and the arrangement in FIG. 14$c$.

In the foregoing embodiment, the number of probable categories is restricted to $K_1$ in the first classification processing, it is restricted to $K_2$ in the second layer processing, it is restricted to $K_3$ in the third classification processing, and it is restricted to $K_4 = 1$ or the recognized output is provided in the fourth discrimination processing. With some input patterns, however, it is often the case that the recognized output may be provided without conducting the processings up to the fourth discrimination. As regards characters which have little similarity among patterns, the designation $r$ of the category indicating the minimum value of $d^{(r)}$ among the outputs of the third classification or the second layer or even the first layer in some cases may be made the recognized output.

Figure 15:
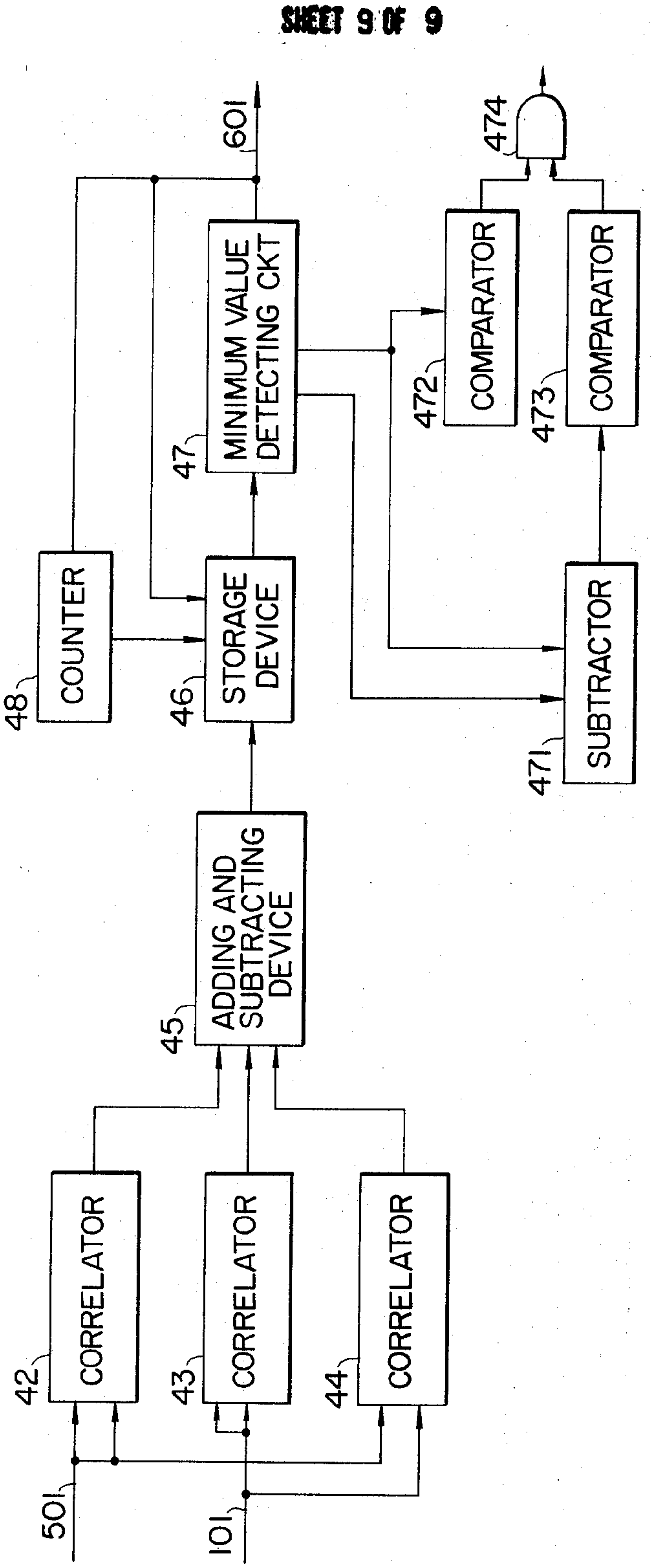

FIG. 15 shows an embodiment based on the above concept. In the figure, parts 42 – 48 are quite the same as the devices shown in FIG. 14$a$.

Two signals of the minimum value Min$\{d^{(r)}\}$ and the next minimum value of $d^{(r)}$ detected by the minimum value detecting circuit 47 are inputted to a subtractor 471, and the output of the subtractor 471 is inputted to a comparator 473.

On the other hand, the minimum value Min $\{d^{(r)}\}$ is also inputted to a comparator 472. The objects of the comparisons of the comparators 472 and 473 are predetermined constant values $K_1$ and $K_2$. If Min $\{d^{(r)}\}$ is smaller than $K_1$, the output of the comparator 472 is "1." Otherwise, it is "0." The output of the comparator 473 is "1" if the output of the subtractor 471 is larger than $K_2$, and is "0" otherwise. That is, when the distance or deviation between the input pattern and the $r$-th reference pattern closest thereto is sufficiently small and is below $K_1$, the output of the comparator 472 becomes "1." If the difference between the minimum value Min $\{d^{(r)}\}$ and the second minimum value is sufficiently large and is above $K_2$, the output of the comparator 473 becomes "1." Reference numeral 474 designates an AND gate, which produces an output "1" when the comparators 472 and 473 are of "1" at the same time. If the output of the AND gate 474 becomes "1," it is no longer necessary to select a plurality of probable categories for the input pattern. The designation $r$ of the category corresponding to Min $\{d^{(r)}\}$ is accordingly provided as a recognized output, to complete the processing. In the case where the output of the AND gate 474 is "0," the above procedure is ineffective, and the $K_1 - K_3$ probable categories are selected in dependence on the respective classification. In the foregoing way, the processing efficiency can be more enhanced, and the effect is great.

Although, in the foregoing embodiments, all the processings are executed by means of series arithmetic devices, use of parallel arithmetic devices can sharply raise the processing speed, and is greatly effective.

As described above, according to the present invention, recognition of patterns having a vast amount of categories, such as Chinese characters, can be efficiently carried out. The invention is therefore effective very greatly.

What we claim is:

1. A pattern recognizing system comprising:

first quantizing means for converting an unknown pattern to be recognized into a first signal corresponding to a first number of picture elements;

second quantizing means for converting the same unknown pattern into a second signal corresponding to a second number of picture elements, said second number of the picture elements in the second signal being less than said first number of the picture elements in the first signal;

first storage means for storing signals representing a plurality of classifying reference patterns;

classifying means for comparing the second signal from said second quantizing means with each of the signals of the classifying reference patterns from said first storage means, including selecting means for selecting at least one pattern from among the classifying reference patterns as a probable pattern;

second storage means for storing signals representing a plurality of discriminating reference patterns;

and discriminating means for comparing the first signal from said first quantizing means with each of the signals of the discriminating reference patterns from said second storage means belonging to the probable classifying reference pattern selected by said classifying means, thereby carrying out the discrimination of the unknown pattern.

2. A pattern recognizing system according to claim 1, in which said second quantizing means comprises register means for storing the first signal from said first quantizing means, compressor means for compressing successively a plurality of picture elements constituting the first signal into a single element and converter means for converting the single element compressed by said compressing means into the quantized second signal.

3. A pattern recognizing system according to claim 1, in which said classifying means comprises calculating means for calculating the deviations between the second signal from said second quantizing means and each of signals of the classifying reference patterns from said first storage means and detecting means for selecting the classifying reference pattern which indicates the minimum value among the deviations obtained by said calculating means.

4. A pattern recognizing system according to claim 1, in which said discriminating means comprises calculating means for calculating the deviations between the first signal from said first quantizing means and each of the signals of the discriminating reference patterns belonging to the probably classifying reference pattern selected by said classifying means and detecting means for selecting the discriminating pattern which indicates the minimum value among the deviations obtained by said calculating means.

5. A pattern recognizing system comprising:

first, second, third and fourth quantizing means for converting an unknown pattern to be recognized into first, second, third and fourth quantized signals each corresponding to a number of picture elements, respectively, the numbers of the picture elements of the first, second, third and fourth quantized signals, $X_1$, $X_2$, $X_3$ and $X_4$ being related as $X_1<X_2<X_3<X_4$;

first, second and third storage means for storing signals corresponding to first, second and third classifying reference patterns, respectively;

fourth storage means for storing signals corresponding to discriminating reference patterns;

first classifying means for comparing the first quantized signal from said first quantizing means with each of signals of the first classifying reference patterns from said first storage means and selecting at least one pattern from among the first classifying reference patterns;

second classifying means for comparing the second quantized signal from said second quantizing means with each of signals of the second classifying reference patterns from said second storage means, belonging to the first classifying reference pattern selected by said first classifying means and selected at least one pattern from among the second classifying reference patterns;

third classifying means for comparing the third quantized signal from said third quantizing means with each of signals of the third classifying reference patterns from said third storage means, belonging to the second classifying pattern selected by said second classifying means and selecting at least one pattern from among the third classifying reference patterns; and discriminating means for comparing the fourth quantized signal from said fourth quantizing means with each of signals of the classifying reference patterns from said fourth storage means, belonging to the third classifying pattern selected by said third classifying means and selecting a pattern from among the fourth classifying reference patterns, thereby carrying out the discrimination of the unknown pattern.

* * * * *